(12) United States Patent
Freshour

(10) Patent No.: US 9,297,712 B2
(45) Date of Patent: Mar. 29, 2016

(54) INTEGRAL HOUSING LOAD CELL SYSTEM AND APPARATUS

(71) Applicant: Goodrich Corporation, Charlotte, NC (US)

(72) Inventor: Thomas Freshour, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 338 days.

(21) Appl. No.: 13/934,558

(22) Filed: Jul. 3, 2013

(65) Prior Publication Data
US 2015/0008800 A1 Jan. 8, 2015

(51) Int. Cl.
G01L 1/00 (2006.01)
G01L 3/10 (2006.01)
F16D 65/18 (2006.01)
H02K 11/00 (2006.01)
G01L 1/22 (2006.01)

(52) U.S. Cl.
CPC ............... G01L 3/108 (2013.01); F16D 65/18 (2013.01); H02K 11/0042 (2013.01); G01L 1/22 (2013.01)

(58) Field of Classification Search
CPC ........... G01L 1/22; G01L 3/108; F16D 65/18; F16D 2121/24; H02K 7/06; H02K 11/0042; H02K 2205/03; H02K 7/088
USPC .............................................. 73/760, 855, 856
See application file for complete search history.

(56) References Cited

U.S. PATENT DOCUMENTS

| 4,023,402 | A | * | 5/1977 | Watanabe ........................ 73/855 |
| 5,523,662 | A | * | 6/1996 | Goldenberg et al. ..... 318/568.11 |
| 7,896,198 | B2 | * | 3/2011 | Mehus et al. .................... 222/77 |
| 2002/0049382 | A1 | * | 4/2002 | Suh et al. ....................... 600/449 |
| 2012/0111643 | A1 | * | 5/2012 | Lindner ............................. 177/1 |
| 2014/0033505 | A1 | * | 2/2014 | Skolaude ........................ 29/512 |

* cited by examiner

Primary Examiner — Max Noori
(74) Attorney, Agent, or Firm — Snell & Wilmer L.L.P.

(57) ABSTRACT

A strain gage system for an electric motor actuator is provided. The strain gage system may be coupled to or integrally formed in a housing of the electric motor actuator. In various embodiments, the strain gauge system may comprise one or more principle strain gages. In various embodiments, the strain gage system may comprise one or more transverse strain gages.

20 Claims, 2 Drawing Sheets

INTEGRAL HOUSING LOAD CELL SYSTEM AND APPARATUS

FIELD

The present disclosure relates to braking systems and, more specifically, to an integral load cell housing for an electric motor actuator.

BACKGROUND

Typical electric motor actuators in aircraft and/or large vehicle (e.g., trains, commercial equipment, and/or the like) brake systems may employ a load cell that is installed within the actuator housing. When the actuator is engaged, the load cell is loaded in compression. This compressive loading may deflect and/or deform the load cell, creating inaccuracies in measurement and requiring more frequent calibration and maintenance.

SUMMARY

In various embodiments, an electric motor actuator may comprise a housing, a first strain gage, and a second strain gage. The first strain gage may be installed on the housing. The second strain gage may also be installed on the housing. The first strain gage may be installed on the housing 180° degrees from the second strain gage.

In various embodiments, a strain gauge system may comprise a housing, a first strain gage assembly, a wiring terminal and a wire. The housing may comprise a first flange. The first strain gage assembly may be installable on the housing. In this regard, an axis of the strain gage assembly may be centered on the flange. Moreover, a portion of the strain gage assembly may be coupled to the housing at a first distance from the flange. The wiring terminal may be in electronic communication with the first strain gauge assembly. The wire may be configured to connect the first strain gage assembly to the wiring terminal.

In various embodiments, an electric motor actuator may comprise a housing, a cover, a first principle strain gage and a second principle strain gage. The housing may comprise a first end and the second end. The first end may have a first flange and a second flange. The cover may be removably coupled to the second end. The first principle strain gage may be installed between the first flange and the second end. The second principle strain gage may be installed between the second flange and the second end.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a brake system may comprise an electric motor actuator ("EMA"). The EMA may be coupled to or otherwise operate a pressure generating device such as, for example, a ball screw, a ram, and/or the like. In operation, the EMA may cause the pressure generating device to move and/or exert a force on other brake system structure such as, for example, a brake disk or pad to exert a stopping force on a wheel or other suitable moving structure. This stopping force may load and/or exert a corresponding force on the EMA structures such as, for example, an EMA housing. This load may also be measured to determine the amount of braking force being applied when the brake system is activated.

Figure 1:
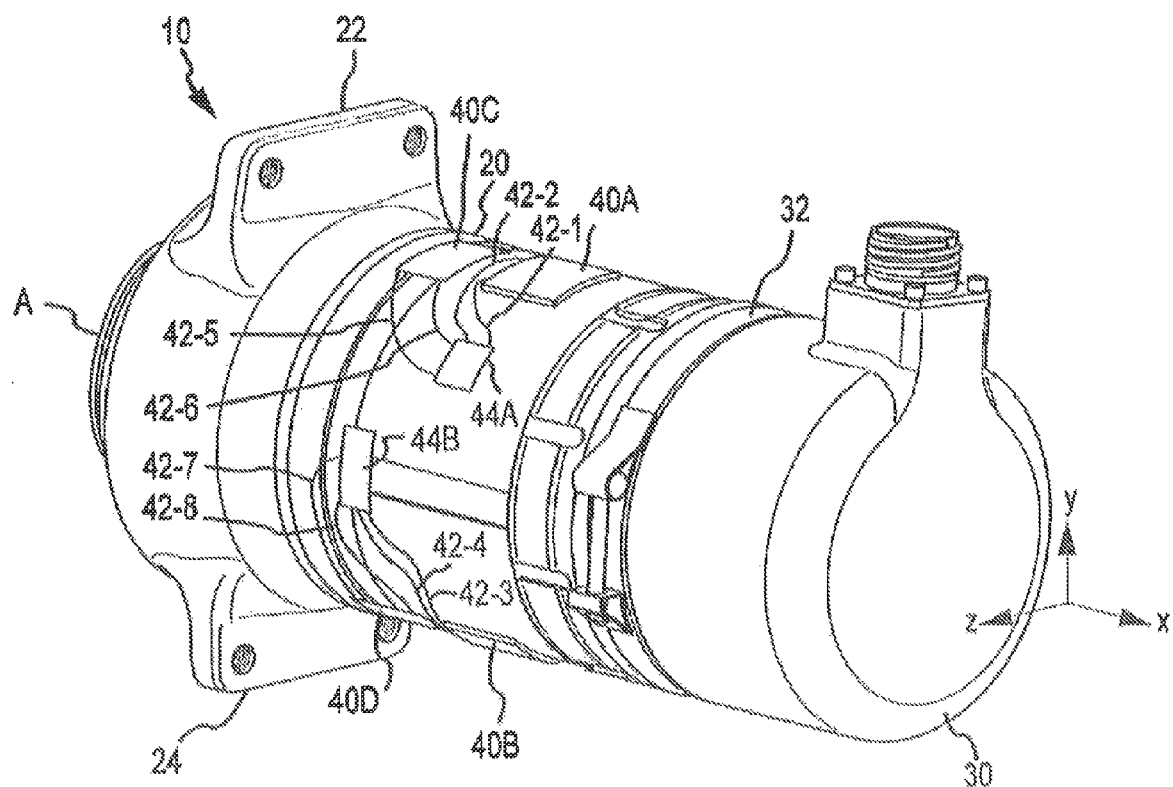
FIG. 1 illustrates a side view of an electric motor actuator in accordance with various embodiments.
Figure 2:
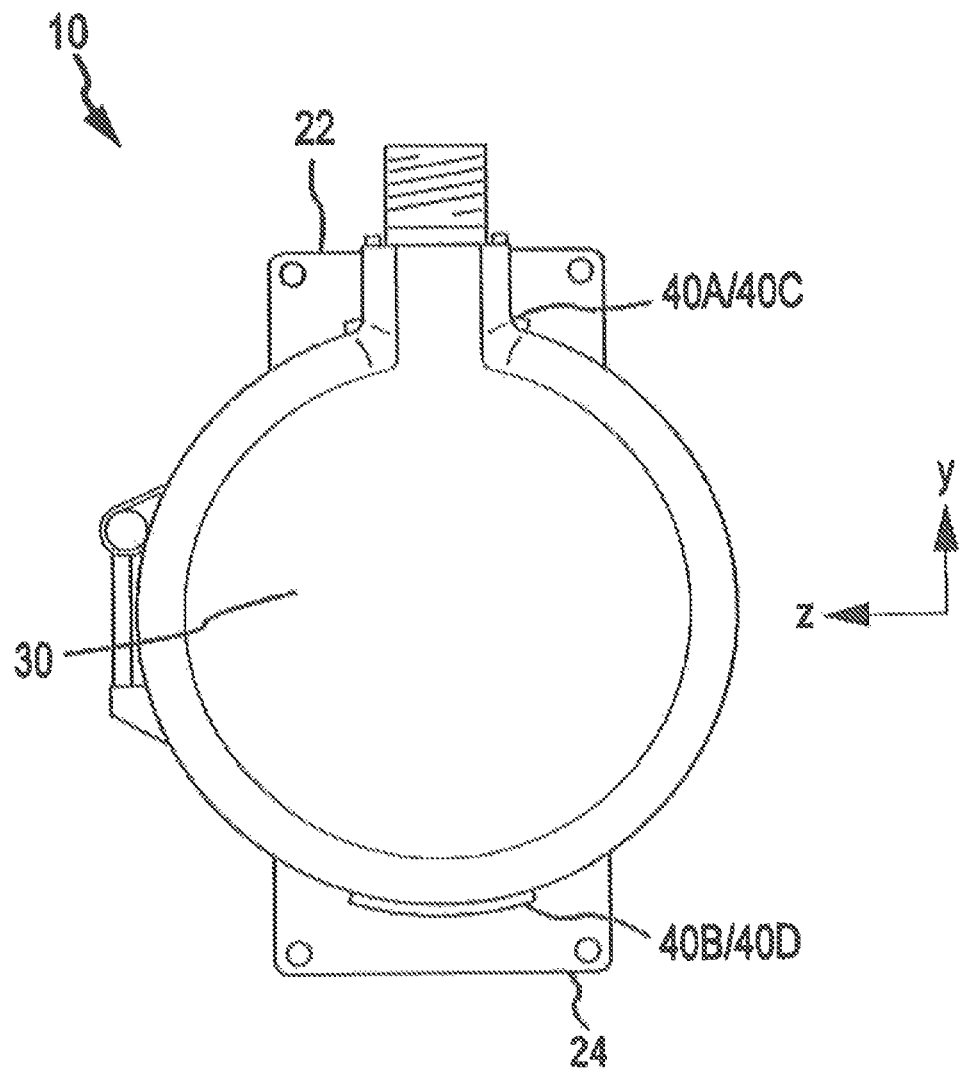
FIG. 2 illustrates a top view of an electric motor actuator in accordance with various embodiments.

In various embodiments, FIG. 1 shows a perspective side view of an EMA 10 and includes a three dimensional x-y-z axis for reference and to aid in description. In various embodiments, FIG. 2 shows a top view of an EMA 10 and includes a two dimensional y-z axis for reference. In various embodiments, EMA 10 may comprise a housing 20, and a cover 30. Cover 30 may be installable on and/or operatively coupled to housing 20. Housing 20 and/or cover 30 may be any suitable material such as, for example, steel, aluminum, a composite, and/or the like.

In various embodiments, housing 20 may also comprise or be configured with one or more strain gages, including for example, strain gage 40 (shown in FIG. 1, as strain gage 40A, strain gage 40B). Strain gage 40 may be, for example, an EK-13-062AU-120DP strain gage. Each strain gage 40 may comprise or be configured with one or more wires 42 (shown in FIG. 1 as wire 42-1, wire 42-2, wire 42-3, wire 42-4).

In various embodiments, strain gage 40 may be attached to a substantially flat portion of housing 20. The strain gage may be installed on a portion of housing 20 that may uniformly distribute load. For example, the installation region may be the substantially cylindrical portion of housing 20 between above a first flange 22/second flange 24 and below a collar 32 of cover 30. In this regard, strain gage 40 may be positioned and wired in a manner that they measure tension along the length of housing 20.

In various embodiments and with reference to FIG. 2, two strain gages 40 (e.g., strain gage 40A and strain gage 40B) may be installed 180° apart, such that strain gages 40A (e.g., first principle strain gage) and 40B (e.g., second principle strain gage) are installed on an outer surface of EMA 10 (e.g., housing 20 as shown in FIG. 1). Strain gage 40A may be centered in line with the first flange 22 with respect to the z-axis. Similarly, strain gage 40B may be centered in line with the second flange 24 with respect to the z-axis.

In various embodiments, two strain gages 40 (e.g., strain gage 40C and strain gage 40D) may similarly be installed 180° apart and may be transverse to strain gages 40A and 40B. In this regard, strain gages 40C (e.g., first transverse strain gage) and 40D (e.g., second transverse strain gage) may be generally perpendicular to the x-y plane. Strain gage 40C may be centered in line with the first flange 22 with respect to the z-axis. Similarly, strain gage 40D may be centered in line with the second flange 24 with respect to the z-axis. As discussed herein, each strain gage 40 (e.g., strain gages 40C and 40D) may comprise or be configured with one or more wires 42 (shown in FIG. 1 as wire 42-5, wire 42-6, wire 42-7, wire 42-8).

In various embodiments, strain gages 40A, 40B, 40C, and 40D may be positioned and wired in Wheatstone bridge. This configuration allows strain gages 40A, 40B, 40C, and 40D to measure tension along the length of housing 20 (e.g., along the x-axis) and minimize the effects of bending (e.g., deflection and/or bending along the y-axis and/or z-axis). More specifically, the deflection and associated strain measured by strain gages 40C and 40D may be used to adjust and/or normalize the deflection and associated strain measured by strain gages 40A and 40l to more accurately estimate the corresponding liner load on housing 20 (e.g., the load along the x-axis).

In various embodiments, strain gages 40A and 40B may be generally located approximately 2.020 inches (approximately 5.131 centimeters) from the top A of housing 20. Strain gages 40C and 40D may be installed adjacent to and above strain gages 40A and 40B (e.g., with respect to top A of housing 20) in a transverse orientation, in response to EMA 10 being actuated, housing 20 may be loaded from flanges 22/24 to the bottom end of the housing 20. This load may be measured by strain gages 40A, 40B, 40C, and 40D to create a signal that may be used for load control EMA 10.

In various embodiments, strain gages 40A, 40B, 40C, and 40D may be installed on housing 20 in any suitable fashion. For example, a bonding film (e.g., M PLY-001 Kapton film) may be installed on housing 20 at a suitable location for strain gage 40 installation as discussed herein. More specifically, the bonding film may be installed at each desired strain gage 40 and/or strain gage assembly 40 (e.g., strain gages 40A and 40C) location. The bonding film may be added for environmental and/or electrical protection.

In various embodiments, strain gages 40A, 40B, 40C, and 40D may be operatively coupled to or in electronic communication with a wiring terminal 44. Wiring terminal 44 (e.g., wiring terminals 44A and 44B as shown in FIG. 1) may be wired, instrumented, attached or otherwise be in electronic communication with a sensor, amplifier and/or control unit. The bonding film, strain gages 40, and/or wiring terminals 44 form a strain gage that may be operatively coupled and/or installed on housing 20 a suitable adhesive. The assembly (e.g., the bonding film, strain gages 40, and/or wiring terminals 44) may be baked for a suitable time to cure the film and adhesive.

In various embodiments and as discussed herein, strain gages 40 may be coupled to one or more wires 42 (e.g., wire 42-1, wire 42-2, wire 42-3, wire 42-4, wire 42-5, wire 42-6, wire 42-7, and wire 42-8 as shown in FIG. 1). Wire 42 may be any suitable wire. Wire 42 may be configured to join the one or more strain gages 40 to wiring terminals 44. Wires 42 may be any suitable length. For example, wires 42 may be approximately four (4) ins, long. Moreover, each of the one or more wires 42 may be substantially the same length.

In various embodiments, at least portions of strain gages 40, wires 42, and wiring terminals 44 may be covered by a coating, tape, protectant and/or the like to protect the strain gages 40, wires 42, and wiring terminals 44 from environmental exposure (e.g., temperature, contaminants, and/or the like). In this regard, at least portions of strain gages 40, wires 42, and wiring terminals 44 may be covered by a tape such as, for example, a high temperature tape. At least portions of the strain gages 40, wires 42, and wiring terminals 44 may also be coated and/or sealed with a suitable sealer such as silicon.

Prior load cells designed for use with the EMAs attempted to measure load in compression. These load cells were typically installed as separate components inside the actuator housing at the bottom end of the housing. These prior load cells may be susceptible to calibration and zero shifts of load measurements because the load path of the prior load cells varied due to deflection, edge loading, and movement of the load cell within the actuator housing. Moreover, the prior load cells were typically loaded in compression, which can make strain gage measurements less accurate.

EMA 10 and, more specifically, housing 20 and strain gages 40 installed outside of the actuator housing create an instrumented housing 20 that becomes the load cell. The load through housing 20 is measured in tension which negates the effects of deflection, edge loading, and movement that may be present in prior load cells.

In various embodiments, present disclosure provides an EMA 10 with weight and space savings. Moreover, EMA 10 significantly reduces manufacturing and/or instrumentation time. In various embodiments, the systems described herein may provide overall cost savings as compared to prior load cell systems.

In various embodiments, while the integral housing load cells described herein have been described in the context of aircraft applications, one will appreciate in light of the present disclosure, that the integral housing load cells described herein may be used on various other vehicles such as, for example, trains. Moreover, the integral housing load cells described herein may be employed with any suitable electric motor actuator in any installation.

Thus, in various embodiments, the integral housing load cells described herein provide a cost effective and reliable electric motor actuator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric motor actuator for a brake system, comprising:
    a housing comprising an outer surface, and having a first length along a first housing axis, a second length along a second housing axis orthogonal to the first housing axis, and a third length along a third housing axis, orthogonal to the first housing axis and the second housing axis, the electric motor actuator configured to couple to a pressure generating device of the brake system to receive tensioning along the first housing axis by the brake system;
    a first strain gage installed on the outer surface of the housing; and
    a second strain gage installed on the outer surface of the housing, wherein the first strain gage is installed on the outer surface of the housing 180° degrees from the second strain gage, wherein the first strain gage and the second strain gage are configured to measure tensioning along the first housing axis imparted by the brake system.

2. The electric motor actuator of claim 1, wherein the housing further comprises a first flange and a second flange.

3. The electric motor actuator of claim 2, wherein the housing has a substantially cylindrical body portion.

4. The electric motor actuator of claim 3 further comprising a cover.

5. The electric motor actuator of claim 4, wherein the cover is installable on the housing and coupled to the housing with a collar.

6. The electric motor actuator of claim 3, wherein a first axis of the first strain gage is centered in line with the first flange and wherein the first strain gage is installed between the first flange and the cover.

7. The electric motor actuator of claim 1 further comprising a third strain gage and a fourth strain gage.

8. The electric motor actuator of claim 7, wherein the third strain gage comprises a third axis that is oriented transverse to the first axis of the first strain gage.

9. The electric motor actuator of claim 7, wherein the fourth strain gage comprises a fourth axis that is oriented transverse to a second axis of the second strain gage.

10. The electric motor actuator of claim 7, wherein the housing further comprises a first flange and a second flange, and wherein the third strain gage is installed between the first strain gage and the first flange.

11. A strain gauge system for an electric motor actuator of a brake system, comprising:
    a housing comprising a housing outer surface and a first flange coupled to the housing outer surface;
    a first strain gage assembly installable on the housing outer surface, wherein the first flange and the first strain gage assembly are centered on a first axis of the housing and wherein a portion of the first strain gage assembly is coupled to the housing outer surface at a first distance from the first flange;
    a wiring terminal in electronic communication with the first strain gauge assembly; and
    a wire configured to connect the first strain gage assembly to the wiring terminal, wherein the electric motor actuator is configured to couple to a pressure generating device of the brake system, wherein the first strain gage assembly is configured to measure tensioning imparted by the brake system along a second axis of the housing, orthogonal to the first axis of the housing.

12. The strain gauge system of claim 11, further comprising a second strain gage assembly, wherein the housing outer surface comprises a second flange.

13. The strain gauge system of claim 12, wherein the second strain gage assembly is installable on the housing outer surface and is centered on the second flange.

14. The strain gauge system of claim 11, wherein the first strain gage assembly comprises a first principle strain gage and a first transverse strain gage.

15. The strain gauge system of claim 14, wherein the first principle strain gage is configured to measure a linear load on the housing.

16. The strain gauge system of claim 14, wherein the first transverse strain gage is configured to measure a bending load on the housing.

17. An electric motor actuator for a brake system, comprising:
    A cylindrical housing comprising a housing outer surface and a first end and a second end aligned along a cylindrical axis, the first end having a first flange and a second flange;
    a cover removably coupled to the second end;
    a first principle strain gage installed between the first flange and the second end on the housing outer surface; and
    a second principle strain gage installed between the second flange and the second end on the housing outer surface wherein the first principle strain gage and the second principle strain gage are configured to measure tensioning along the cylindrical axis imparted by the brake system.

18. The electric motor actuator of claim 17, further comprising a first transverse strain gauge installed adjacent to the first principle strain gage and a second transverse strain gage installed adjacent to the second principle strain gauge.

19. The electric motor actuator of claim 18, wherein the first principle strain gage and the second principle strain gage are configured to measure linear load on the housing.

20. The electric motor actuator of claim 19, wherein the first transverse strain gage and the second transverse strain gage are configured to measure a bending load on the housing, and wherein at least a portion of the bending load is used to normalize the linear load.

\* \* \* \* \*